United States Patent
Kitamura

(10) Patent No.: US 11,892,557 B2
(45) Date of Patent: Feb. 6, 2024

(54) RADAR DEVICE

(71) Applicant: DENSO CORPORATION, Kariya (JP)

(72) Inventor: Takayuki Kitamura, Kariya (JP)

(73) Assignee: DENSO CORPORATION, Kariya (JP)

( * ) Notice: Subject to any disclaimer, the term of this patent is extended or adjusted under 35 U.S.C. 154(b) by 428 days.

(21) Appl. No.: 17/332,440

(22) Filed: May 27, 2021

(65) Prior Publication Data

US 2021/0286048 A1  Sep. 16, 2021

Related U.S. Application Data

(63) Continuation of application No. PCT/JP2019/045602, filed on Nov. 21, 2019.

(30) Foreign Application Priority Data

Nov. 28, 2018 (JP) ................. 2018-222524

(51) Int. Cl.
*G01S 7/292* (2006.01)
*G01S 13/12* (2006.01)
*G01S 13/931* (2020.01)

(52) U.S. Cl.
CPC ............ *G01S 7/2926* (2013.01); *G01S 13/12* (2013.01); *G01S 13/931* (2013.01)

(58) Field of Classification Search
None
See application file for complete search history.

(56) References Cited

U.S. PATENT DOCUMENTS

| | | | |
|---|---|---|---|
| 2008/0088498 A1 | 4/2008 | Suzuki et al. | |
| 2013/0229301 A1* | 9/2013 | Kanamoto | G01S 13/584 342/158 |
| 2017/0082744 A1* | 3/2017 | Matsumoto | G01S 7/352 |

FOREIGN PATENT DOCUMENTS

| | | |
|---|---|---|
| JP | 2009-156582 A | 7/2009 |
| JP | 2013-167580 A | 8/2013 |

* cited by examiner

*Primary Examiner* — Whitney Moore
(74) *Attorney, Agent, or Firm* — MASCHOFF BRENNAN

(57) ABSTRACT

The radar device includes a transmission section, a reception antenna section, a reception section, a frequency analysis section, a first correlation matrix generation section, and an averaging process section. The transmission section transmits a chirp at cycle periods, the number of the transmitted chirps being a repetition number. The first correlation matrix generation section generates, for the chirps, first correlation matrixes based on complex information on long-distance bins in distance spectra corresponding to respective reception antennas that have received the identical chirp. The averaging process section performs, for the respective long-distance bins, an averaging process for the repetition number of first correlation matrixes generated so as to correspond to the long-distance bins, to generate average correlation matrixes.

4 Claims, 13 Drawing Sheets

WHEN NUMBER OF PHASES P = 0

RADAR DEVICE

CROSS-REFERENCE TO RELATED APPLICATION

The present application is based on and claims the benefit of priority from earlier Japanese Patent Application No. 2018-222524 filed Nov. 28, 2018, the description of which is incorporated herein by reference.

BACKGROUND

Technical Field

The present disclosure relates to a radar device that transmits and receives radar waves to detect an object that has reflected the radar waves.

Related Art

A radar device calculates a relative velocity of an object based on a complex reception signal from the object at which transmission signals repeatedly transmitted at predetermined cycle periods through an antenna are reflected.

SUMMARY

As an aspect of the present disclosure, a radar device is provided which includes:
- a transmission section configured to, every time a predetermined measurement period elapses, repeatedly transmit a chirp, whose frequency changes with respect to time, at predetermined cycle periods, the number of the transmitted chirps being a predetermined repetition number;
- a reception antenna section that has a plurality of reception antennas configured so as to receive the chirps reflected from an object;
- a reception section configured to generate beat signals for the respective chirps, for a respective plurality of reception signals received by the plurality of reception antennas of the reception antenna section;
- a frequency analysis section configured to perform a frequency analysis for the respective beat signals to calculate distance spectra that are frequency spectra, in which a distance to the object that has reflected the chirp is associated with a frequency, for the respective plurality of reception antennas and the respective plurality of beat signals;
- a first correlation matrix generation section configured to define a plurality of frequency bins indicating different frequency ranges in the distance spectra as distance bins, define any of the distance bins, whose frequency corresponding to the distance bin is equal to or less than a predetermined short distance determination frequency, as short-distance bins, define any of the distance bins, whose frequency corresponding to the distance bin is more than the short distance determination frequency, as long-distance bins, and generate, for the repetition number of chirps, first correlation matrixes for the respective distance bins based on complex information on the long-distance bins in the distance spectra corresponding to the respective reception antennas that have received the identical chirp;
- an averaging process section configured to perform, for the respective long-distance bins, an averaging process for the repetition number of first correlation matrixes generated so as to correspond to the long-distance bins, to generate average correlation matrixes for the respective long-distance bins;
- a first azimuth estimation section configured to perform, for the respective long-distance bins, azimuth estimation calculation using the average correlation matrixes corresponding to the long-distance bins;
- a two-dimensional spectrum generation section configured to generate a two-dimensional spectrum represented by the distance spectra and a velocity spectrum, which is a result of a frequency analysis over the plurality of chirps performed for the respective short-distance bins of the distance spectra;
- a second correlation matrix generation section configured to generate one second correlation matrix based on complex information on peaks in the two-dimensional spectrum; and
- a second azimuth estimation section configured to perform azimuth estimation calculation using the second correlation matrix.

DETAILED DESCRIPTION OF THE PREFERRED EMBODIMENTS

JP 2013-167580 A discloses a radar device that calculates a relative velocity of an object based on a complex reception signal from the object at which transmission signals repeatedly transmitted at predetermined cycle periods through an antenna are reflected.

In the field of in-vehicle radars, peripheral monitoring systems using a millimeter-wave radar utilize FCM modulation in which a chirp having a large frequency gradient is repeatedly transmitted at predetermined cycle periods.

FCM modulation is a modulation method that can separate a distance and a velocity on a two-dimensional spectrum. The two-dimensional spectrum is obtained for each reception channel. In FCM modulation, peak complex information on two-dimensional spectra of several reception channels is used to determine one correlation matrix, and the correlation matrix is used to perform azimuth estimation.

Since all sample points of all chirps are used to obtain the two-dimensional spectra, the number of the correlation matrixes corresponding to one object acquired during one cycle is one (that is, the number of snapshots is one).

To accurately separate a plurality of incoming waves in azimuth estimation, the number of snapshots is required to increase to perform correlation suppression of the plurality of incoming waves. As a result of the detailed studies by the inventor, a problem is found that since the number of snapshots is one in the typical processing method of FCM modulation as described above, separating azimuths of a plurality of objects is difficult.

The present disclosure is for improving accuracy in azimuth estimation.

Hereinafter, an embodiment of the present disclosure will be described with reference to the drawings.

A radar device 1 of the present embodiment is installed in a vehicle and detects various objects present around the vehicle.

Figure 1:
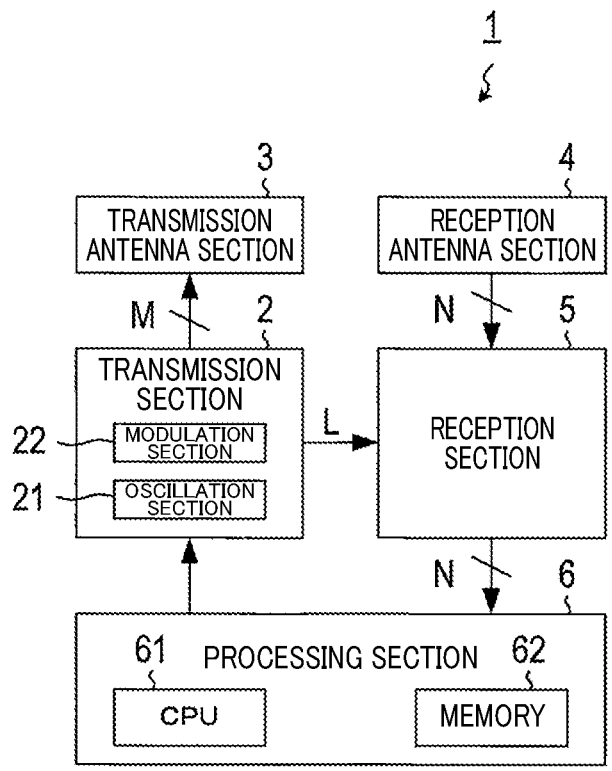
FIG. 1 is a block diagram illustrating a configuration of a radar device.

As shown in FIG. 1, the radar device 1 includes a transmission section 2, a transmission antenna section 3, a reception antenna section 4, a reception section 5, and a processing section 6.

The transmission antenna section 3 has at least one antenna used for transmission. The reception antenna section 4 has a plurality of antennas used for reception.

That is, the radar device 1 is configured so as to have a plurality of transmission and reception antennas each of which is a combination of the antenna included in the transmission antenna section 3 and the antenna included in the reception antenna section 4. In the present embodiment, the radar device 1 includes M antennas (the number of the antennas is M) included in the transmission antenna section 3, N antennas (the number of the antennas is N) included in the reception antenna section 4, and M*N transmission and reception antennas. M*N is an integer equal to or more than 2. The arrangement interval between the antennas included in the transmission antenna section 3 and the arrangement interval between the antennas included in the reception antenna section 4 may be equal or unequal.

Figure 2:
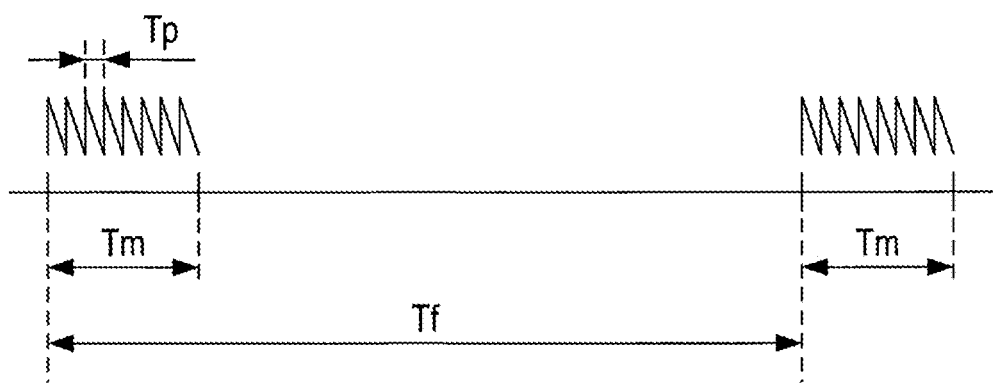
FIG. 2 illustrates a function of an oscillation section.
Figure 3:
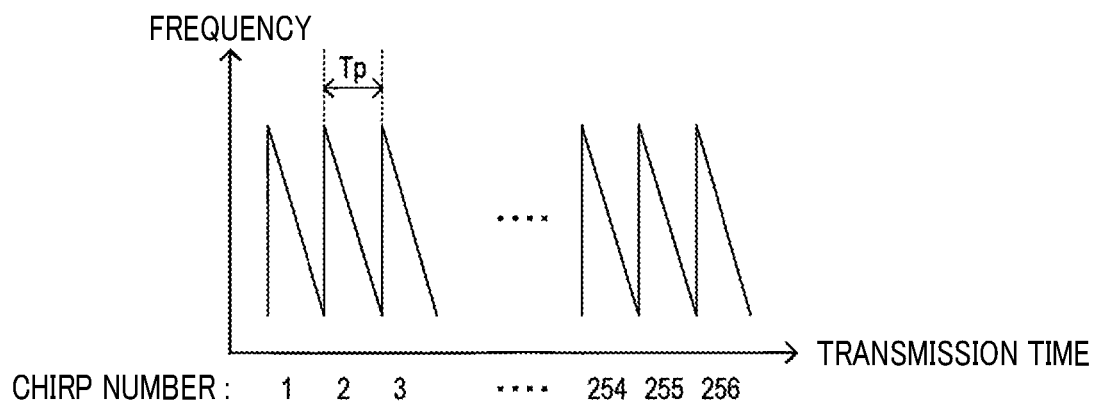
FIG. 3 illustrates a cycle period of chirps.

The transmission section 2 transmits a reception signal that has modulated by the FCM (Fast-Chirp Modulation) method. The transmission section 2 includes an oscillation section 21 and a modulation section 22. The oscillation section 21 generates a common signal having a continuous wave. The oscillation section 21 provides the generated common signal to the modulation section 22 and also provides the generated common signal to the reception section 5 as a local signal L. As shown in FIG. 2, during a measurement time period Tm (e.g., 10 ms) at the head of each frame, which corresponds to a measurement period Tf (e.g., 50 ms), the oscillation section 21 continuously transmits a chirp whose frequency linearly changes with respect to time, the number of the transmitted chirps being a predetermined repetition number K (e.g., 256). As shown in FIG. 3, the transmission section 2 repeatedly transmits a chirp at predetermined cycle periods (repetition periods, repetition cycles) Tp. Chirp numbers 1 to K (256 in the present embodiment) are assigned to the respective chirps in one frame in order of transmission time.

The oscillation section 21 is configured so that the measurement period Tf, the measurement time period Tm, and the cycle period Tp can be appropriately changed according to instructions from the processing section 6. The frequency width of a chirp changed during the cycle period is constant regardless of the cycle period Tp. That is, changing the cycle period Tp can change the change rate of the frequency of a chirp.

An acceptable range of the cycle period Tp, furthermore, an acceptable range of the change rate of the frequency of a chirp, are set so that when a beat signal, which is generated by mixing a transmission signal and a reception signal, is analyzed, a frequency shift depending on a relative velocity with respect to an object is negligibly smaller than a frequency shift depending on a distance to the object.

The modulation section 22 branches the common signal generated by the oscillation section 21 to generate branch signals, the number of which is M, identical to the number of the transmission antenna included in the transmission antenna section 3. The modulation section 22 performs phase shift keying, which changes a phase of the branch signal at the cycle periods Tp, for each of the M branch signals. Hence, M transmission signals provided to the respective transmission antennas are generated. In the phase shift keying, the different amounts of phase rotation $\Delta\phi$ are set for the respective M transmission signals, and the phase of the branch signal is rotated by the amount of phase rotation $\Delta\phi$ at the cycle periods.

Figure 4:
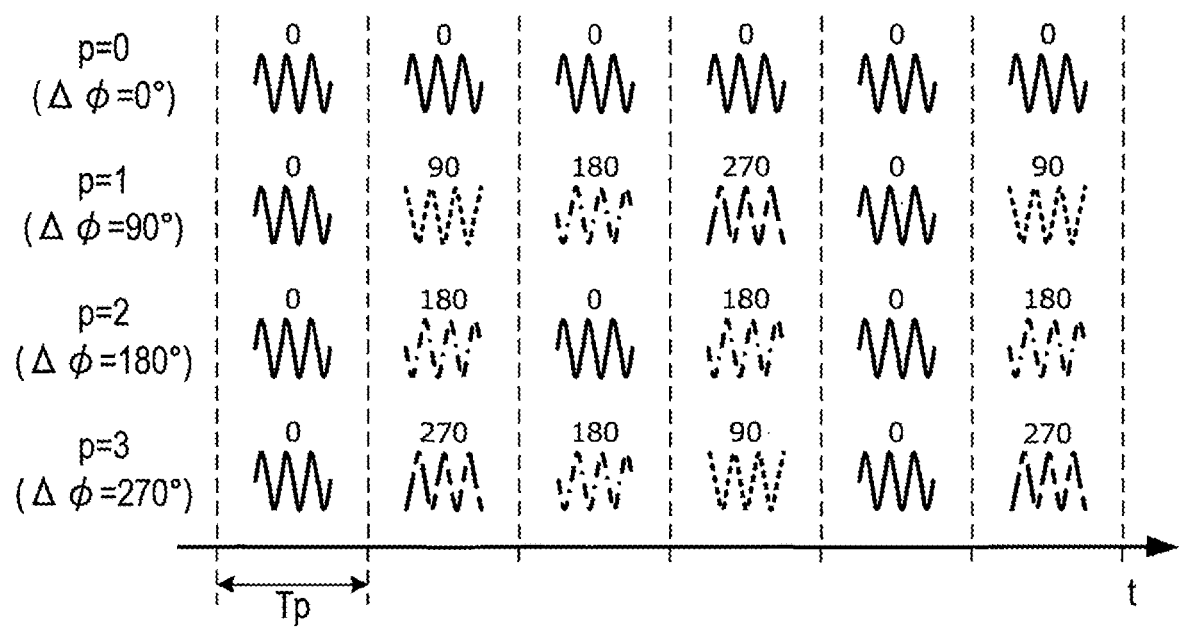
FIG. 4 illustrates an example of the amount of phase rotation used for phase shift modulation in a modulation section.

The number of phases used in the phase shift keying is indicated by P. P is an integer more than M. The modulation section 22 uses P types of amount of phase rotation expressed by $\Delta\phi=p*360°/P$, where p=0, 1, 2, ... P−1. For example, in the case where P=4, as shown in FIG. 4, when p=0, $\Delta\phi$ is 0°, and a phase difference of a transmission signal, which is a signal after the modulation, with respect to the branch signal before the modulation (i.e, the common signal) is 0° during all the cycle periods Tp. When p=1, $\Delta\phi$ is 90°, and a phase difference of a transmission signal with respect to the common signal changes at the cycle periods Tp in order of 0°→90°→180°→270°→0° (and so on). When p=2, $\Delta\phi$ is 180°, and a phase difference of a transmission signal with respect to the common signal changes at the cycle periods in order of 0°→180°→0°→180°→0° (and so on). When p=3, $\Delta\phi$ is 270°, and a phase difference of a transmission signal with respect to the common signal changes at the cycle periods in order of 0°→270°→180°→90°→0° (and so on).

Since P>M is set as described above, the phase shift keying does not use all the P types of amounts of phase rotation $\Delta\phi$ but uses some of them.

The modulation section 22 is configured so as to appropriately change a setting of the number P of phases, a selection of M types of amount of phase rotation used for phase shift modulation from the P types of amount of phase rotation $\Delta\phi$, and a setting of a correspondence relationship between the selected M types of amount of phase rotation and the M transmission antennas. The setting may be changed according to an instruction from the processing section 6 or changed automatically. When automatically changed, the setting may be changed according to a predetermined pattern or changed randomly.

As shown in FIG. 1, the reception section 5 generates beat signals, which are difference signals with respect to the local signal L, for the respective N reception signals output from the reception antennas included in the reception antenna section 4, and samples the generated beat signals to provide them to the processing section 6.

The processing section 6 is an electronic control unit mainly configured by a microcomputer including a CPU 61 and a memory 62. The memory 62 is, for example, a ROM or a RAM. Various functions of the microcomputer are implemented by the CPU 61 executing a program stored in a non-transitory tangible storage medium. In this example, the memory 62 corresponds to the non-transitory tangible storage medium storing the program. Executing a program performs a method corresponding to the program. Some or all of the functions implemented by the CPU 61 may be performed by hardware such as one or more ICs. The number of microcomputers configuring the processing section 6 may be one or more.

Next, the procedure of the object detection process performed by the processing section 6 will be described. The object detection process is repeatedly performed after the processing section 6 starts.

Figure 5:
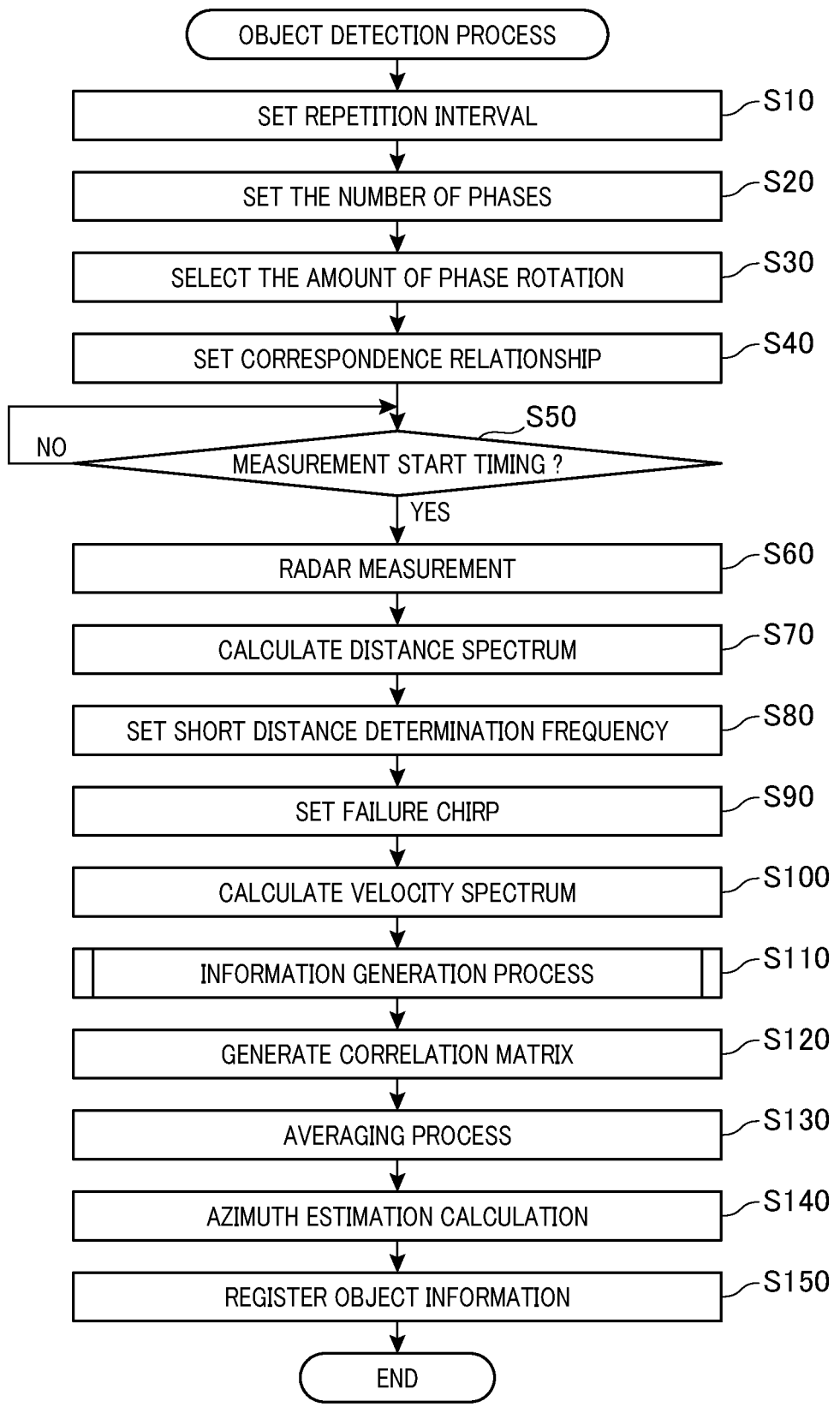
FIG. 5 is a flowchart of an object detection process.

In the object detection process, as shown in FIG. 5, in step S10, the processing section 6 sets the cycle period Tp, which is a parameter concerning a common signal generated by the oscillation section 21. As described above, changing the cycle period changes the change rate of the frequency of a chirp. The cycle period Tp may be a fixed value or may be set according to a pattern predetermined every time the present process is performed or by random selection from a plurality of types of value. In S10, the measurement period T and the measurement time period Tm may be appropriately subjected to variable setting.

In S20, the processing section 6 sets the number P of phases used for phase shift modulation in the modulation section 22. The number P of phases is more than the number M of the transmission antennas. For example, P may be set to P=M+1. The number P of phases may be a fixed value or may be set according to a pattern predetermined every time the present process is performed or by random selection from a plurality of types of value.

In S30, the processing section 6 selects M types of amount of phase rotation used for phase shift modulation in the modulation section 22, from P types of amount of phase rotation determined from the number P of phases. The M types of amount of phase rotation are selected so that the amounts of phase rotation are not equally arranged within 360°, that is, are unequally arranged within 360°.

Specifically, when P and M does not have common divisors, the amount of phase rotation can be selected optionally. When P and M have common divisors, it is necessary to carefully select the amount of phase rotation so that arrangement intervals are not repetition of identical patterns.

Figure 6:
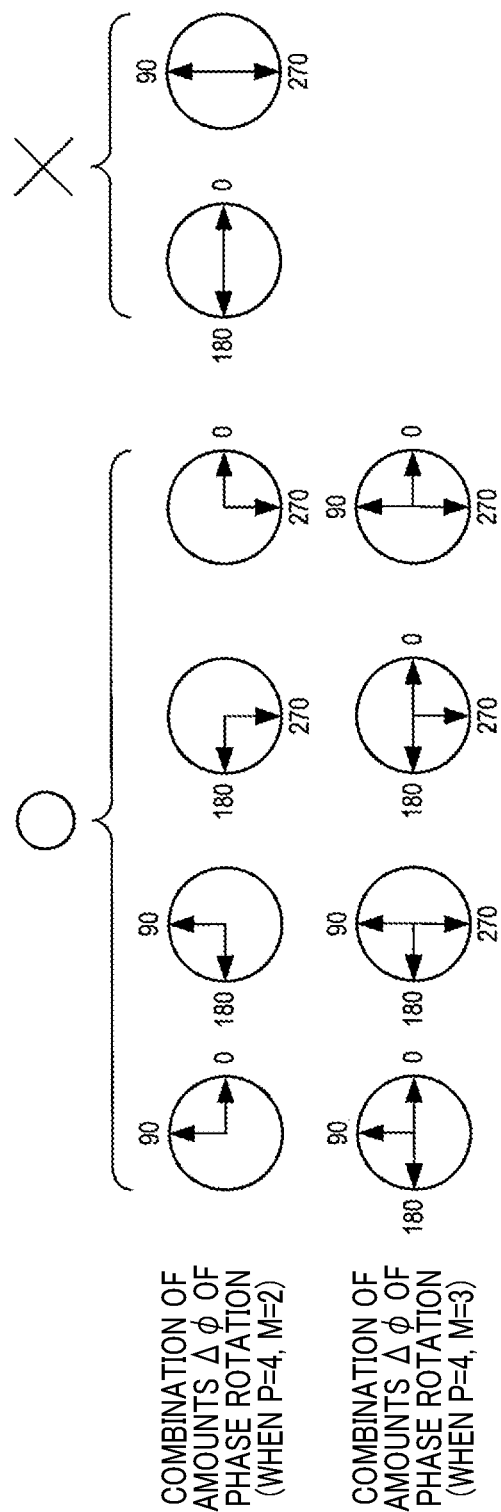
FIG. 6 illustrates selectable or non-selectable combination patterns of the amounts of phase rotation.

For example, as shown in FIG. 6, when P=4 and M=2, although (0°, 90°), (90°, 180°), (180°, 270°), or (270°, 0°) can be selected as a combination of the amounts of phase rotation, (0°, 180°) and (90°, 270°) cannot be selected. When P=4 and M=3, any of (0°, 90°, 180°), (90°, 180°, 270°), (180°, 270°, 0°), and (270°, 0°, 90°) can be selected as a combination of the amounts of phase rotation. In the present embodiment, a combination of the amounts of phase rotation including Δϕ=0° is selected.

The selection of the amounts of phase rotation may be always the same or may be changed among selectable combinations according to a predetermined pattern or at random.

After the processing in S30, as shown in FIG. 5, in S40, the processing section 6 sets a correspondence relationship between the M types of amount of phase rotation selected in S30 and the transmission antennas. The correspondence may be assigned, for example, in accordance with a predetermined rule, or may be assigned randomly. The correspondence may be always the same or may be changed according to a predetermined pattern or at random every time the present process is performed.

Figure 7:
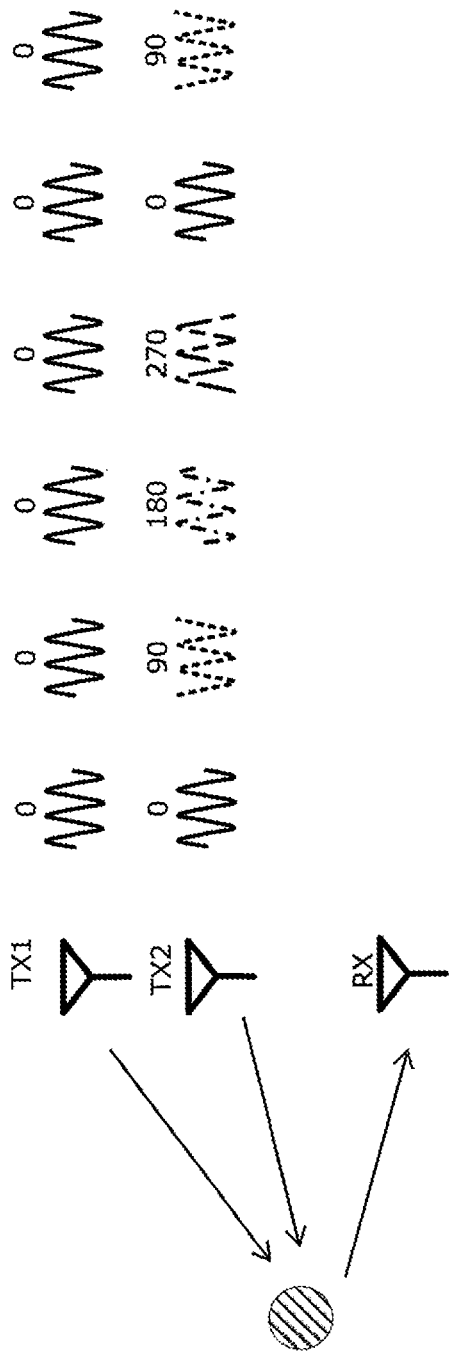
FIG. 7 illustrates an example of selection of the amount of phase rotation.

FIG. 7 illustrate a state in which when P=4 and M=2, and (0°, 90°) is selected as a combination of the amounts of phase rotation to assign Δϕ=0° to a transmission antenna TX1 and assign Δϕ=90° to a transmission antenna TX2, phases of transmission signals respectively provided to the transmission antennas TX1 and TX2 change.

After the processing in S40, as shown in FIG. 5, in S50, the processing section 6 determines whether a measurement start timing has been arrived at. If the measurement start timing has not been arrived at, the processing section 6 repeats the processing in S50 while waiting until the measurement start timing is arrived at. If the measurement start timing has been arrived at, the processing section 6 proceeds to S60. The measurement start timing is timing at which a frame whose length is determined by the measurement period Tf is exchanged.

In S60, the processing section 6 operates the transmission section 2 according to the setting result, and performs radar measurement. Specifically, the processing section 6 causes the transmission section 2 to repeatedly transmit a chirp signal at predetermined cycle periods Tp during the measurement time period Tm, and acquires a sampling result of a beat signal generated from the reception signal.

Figure 8:
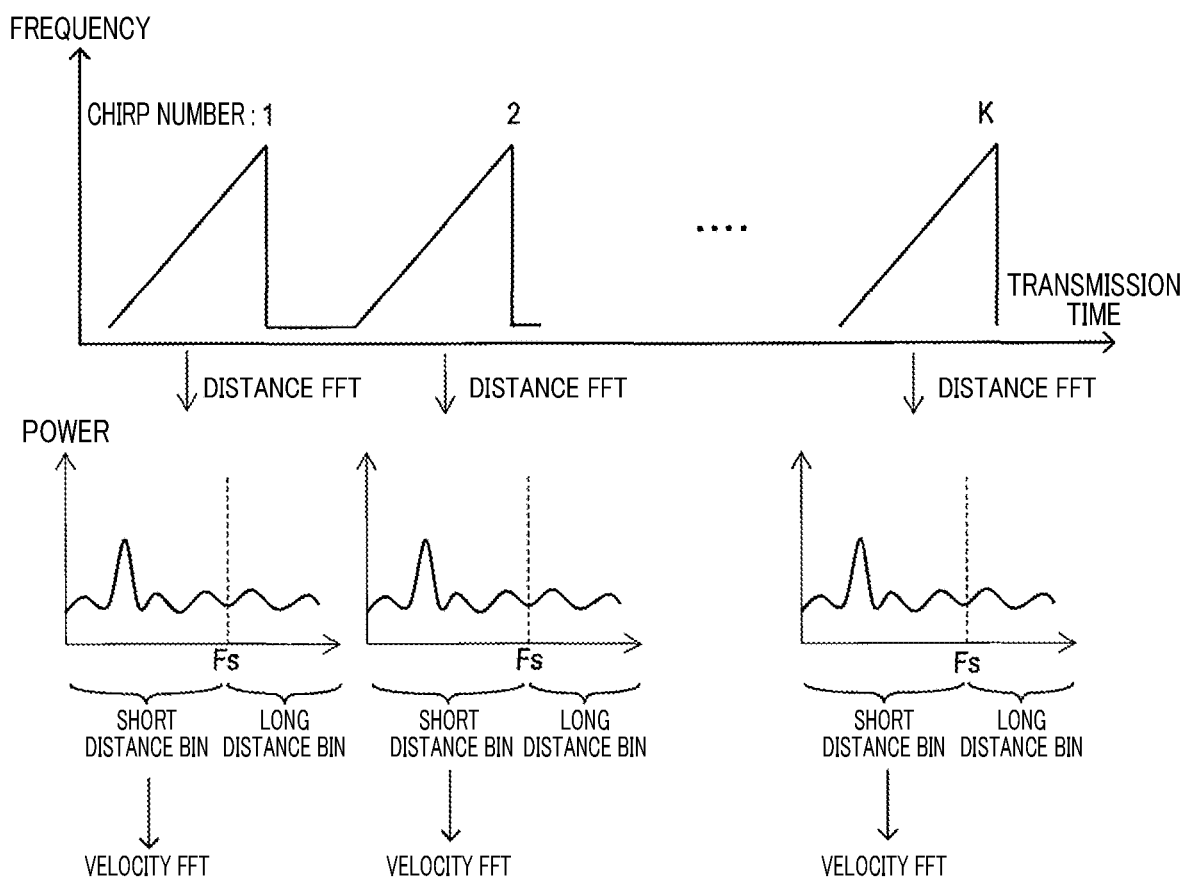
FIG. 8 illustrates a relationship between chirps and distance spectra.

In S70, the processing section 6 performs a frequency analysis of sampling results of beat signals acquired from the N reception antennas for of the respective reception antennas and chirp signals. Thereby, as shown in FIG. 8, K distance spectra are calculated for each of the reception antennas. In each of the distance spectra, a peak appears in a frequency depending on the time required for a radiation wave transmitted from the transmission antenna to travel between the transmission antenna and an object reflecting the radiation wave (i.e., a distance to the object). A frequency bin in a distance spectrum is referred to as a distance bin.

After the processing in S70, as shown in FIG. 5, in S80, the processing section 6 sets a short distance determination frequency Fs. Specifically, the processing section 6 first acquires current location information indicating a current location of the vehicle and a road information on roads around the current location, from a navigation system installed in the vehicle. Then, the processing section 6 determines whether the vehicle is traveling through a tunnel based on the acquired current location information and road information. If determining that the vehicle is traveling through a tunnel, the processing section 6 sets the short distance determination frequency Fs to a preset first determination value. In contrast, if determining that the vehicle is not traveling through a tunnel, the processing section 6 sets the short distance determination frequency Fs to a determination value set so as to be more than the first determination value.

After the processing in S80, in S90, the processing section 6 sets a failure chirp. Specifically, the processing section 6 first determines whether a noise level is a predetermined failure determination level or more for each of the N*K distance spectra calculated in S70. Then, the processing section 6 sets, as a failure chirp, a chirp corresponding to a distance spectrum whose noise level is the failure determination level or more.

After the processing in S90, in S100, the processing section 6 uses the N*K distance spectra calculated in S70 to calculate velocity spectra for the respective reception antennas. Specifically, the processing section 6 extracts signals having the identical frequency bin from K distance spectra concerning the focused reception antenna to perform frequency analysis processing in the direction of the time axis for the extracted signal. As shown in FIG. 8, the processing section 6 performs the processing for distance bins in a range equal to or less than the predetermined short distance determination frequency Fs (hereinafter, short-distance bins).

In the velocity spectrum, when a relative velocity with respect to an object that has reflected a radiation wave from the transmission antenna section 3 is zero, frequencies depending on the amounts of phase rotation assigned to the respective antennas are extracted as Doppler frequencies. That is, the frequency of a signal component corresponding to $\Delta\phi=0°$ is 0 Hz.

Figure 9:
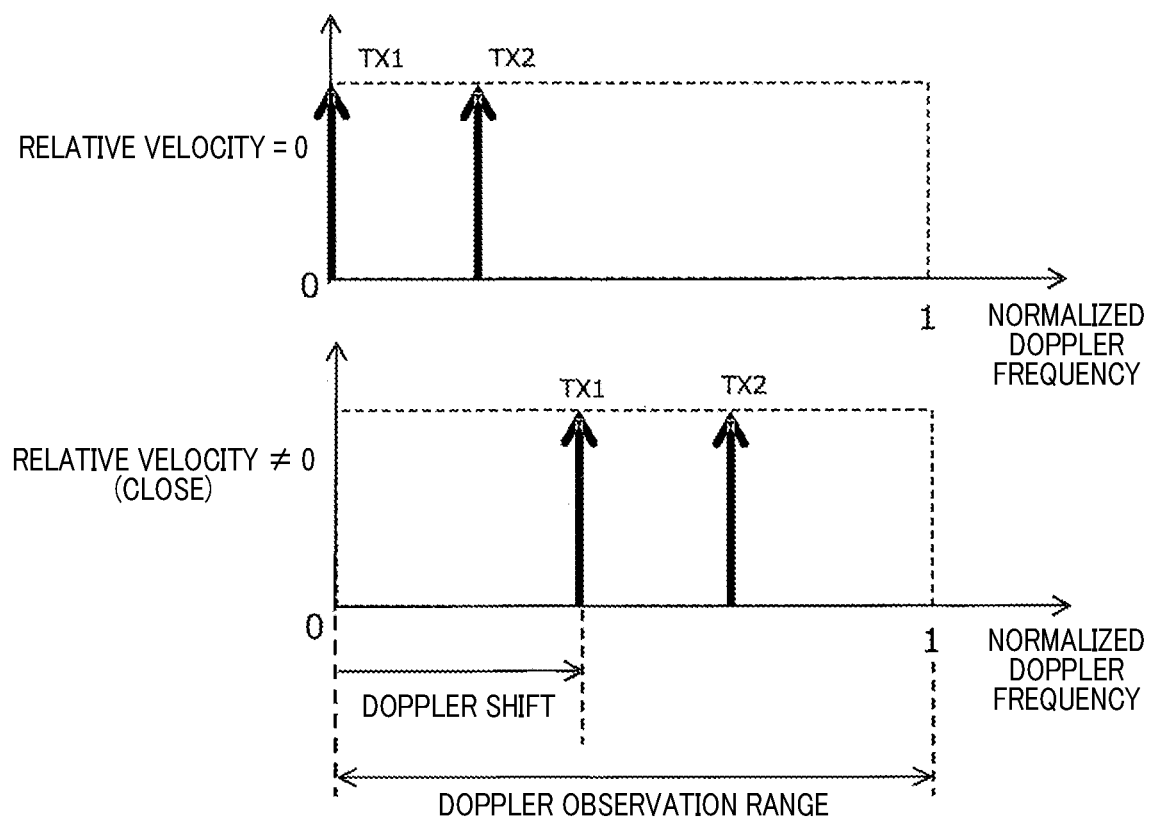
FIG. 9 illustrates an example of groups of peaks of the identical object appearing in a velocity spectrum.

The range in which Doppler frequencies are observed (hereinafter, Doppler observation range) is determined from the cycle period Tp. As shown in FIG. 9, Doppler frequencies are detected at M points included in points obtained by dividing the Doppler observation range by P. In FIG. 9, the upper limit of the Doppler observation range is normalized to 1.

In a velocity spectrum, if a relative velocity with respect to an object is not zero, the M Doppler frequencies shift by the magnitude corresponding to the relative velocity. Depending on the magnitude of the relative velocity, folding back (return) of a frequency occurs.

Figure 10:
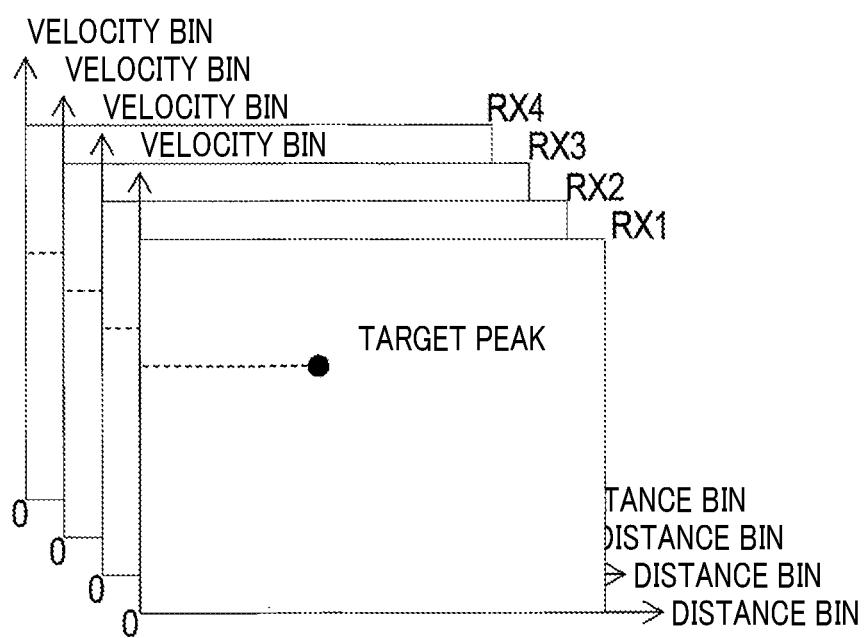
FIG. 10 illustrates a reception spectrum.

From the calculation results in S70 and S100, secondary spectra representing a distance to an object that has reflected radar waves and a relative velocity with respect to the object (hereinafter, reception spectrum) is generated for the respective reception antennas. FIG. 10 illustrates a reception spectrum obtained when the number of the reception antennas is four and a peak detected in the reception spectrum.

After the processing in S100, as shown in FIG. 5, in S110, the processing section 6 performs an information generation process in which the reception spectra are used for the respective reception antennas to calculate a distance to an object that has reflected the radar waves, a relative velocity with respect to the object, and an azimuth in which the object is present.

Next, the procedure of the information generation process performed in S110 will be described.

Figure 11:
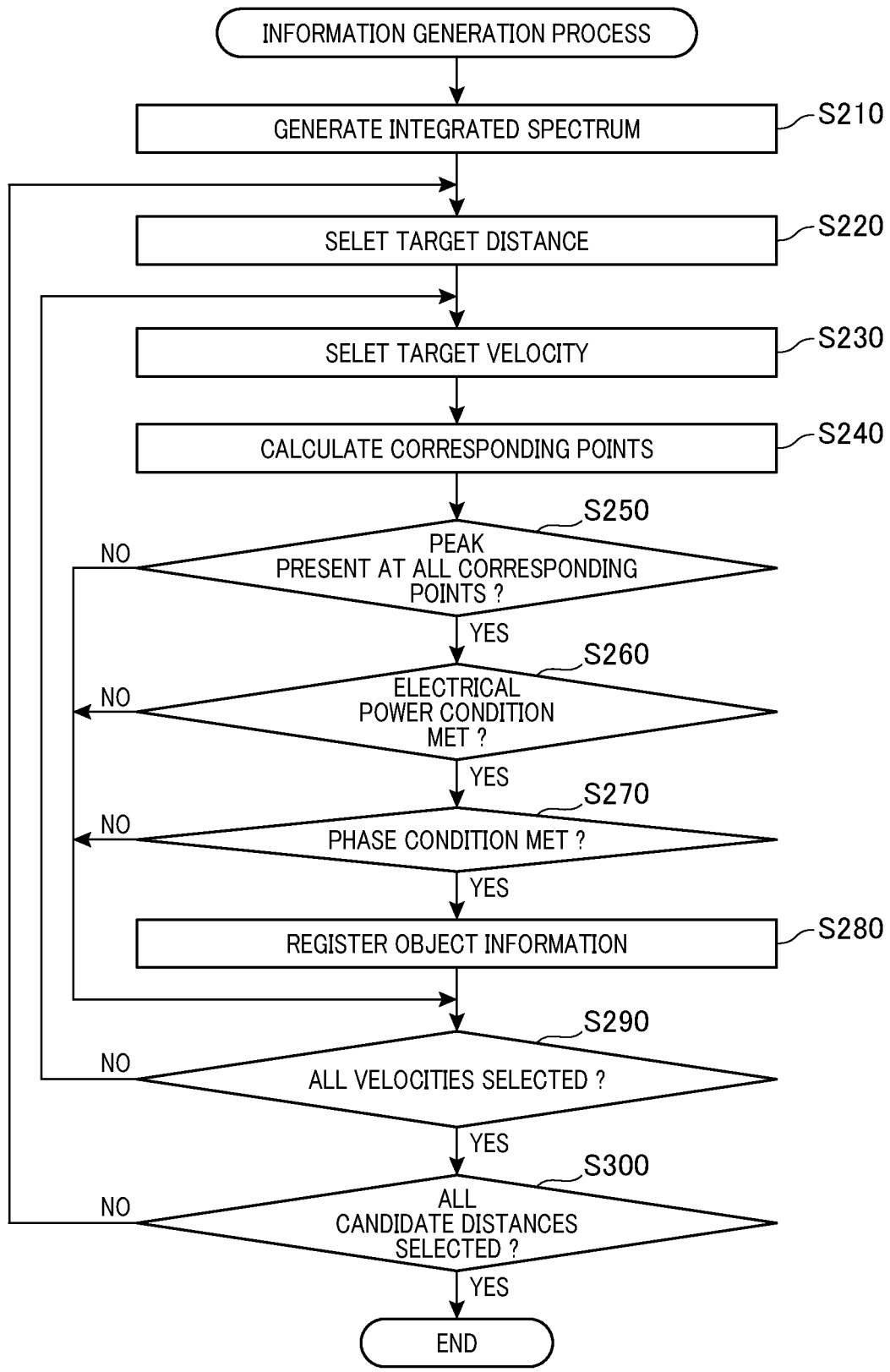
FIG. 11 is a flowchart of information generation process.

On starting the information generation process, as shown in FIG. 11, first in S210, the processing section 6 subjects the N reception spectra generated for the respective reception antennas in S100 to incoherent integration to calculate an integrated spectrum g(r, v). When the reception spectra for the respective reception antennas are indicated by s(r, v, Rch), the integrated spectrum g(r, v) is calculated by using the expression (1), where r is a distance, v is a normalized Doppler velocity, which is 1 when corresponding to an upper limit frequency within the Doppler observation range, and Rch is a number for identifying the reception antenna.

(Expression 1)

$$g(r, v) = \sum_{Rch=1}^{N} |s(r, v, Rch)|^2 \quad (1)$$

The processing section 6 selects, as a target distance r, a distance, which is not yet selected as an object subjected to the processing in the following S230 to S280, from candidate distances from which M or more peaks having intensity equal to or more than a predetermined threshold value have been detected on the integrated spectrum.

In S230, the processing section 6 selects, as a target velocity v, a velocity corresponding to a peak, which is not yet selected as a processing target in the following S240 to S270 from a plurality of peaks detected from the target distance r selected in S220. Herein, the processing section 6 selects velocities in ascending order.

In S240, the processing section 6 assumes that the peak of the target velocity v corresponds the amount of phase rotation $\Delta\phi=0°$, and calculates M−1 corresponding points (r, vj), where j=2 to M, at which it is assumed that peaks corresponding to other amounts of phase rotation are present, according to the expression (2), where x(j) is the amounts of phase rotation other than $\Delta\phi=0°$ selected in S30, V and Vj are normalized Doppler frequencies, which are 0 to 1, and mod(a, m) indicates a remainder obtained when a is divided by m.

(Expression 2)

$$v_j = v + \text{mod}(x(j) - x(1)/P, 1) \quad (2)$$

In S250, the processing section 6 determines whether a peak (i.e., secondary maximum point) is present on the integrated spectrum, for all the corresponding points estimated in S240. If an affirmative determination is made, the processing section 6 proceeds to S260. If a negative determination is made, the processing section 6 proceeds to S290. Hereinafter, M peaks corresponding to the corresponding points are referred to as a candidate peak group.

In S260, the processing section 6 determines whether the candidate peak group meets an electrical power condition. If an affirmative determination is made, the processing section 6 proceeds to S270. If a negative determination is made, the processing section 6 proceeds to S290. The electrical power condition is that the difference in signal intensity between peaks included in the candidate peak group is within a predetermined acceptable range. This is based on knowledge that signal intensity of peaks based on reflected waves from the identical object should be similar.

In S270, the processing section 6 determines whether the candidate peak group meets a phase condition. If an affirmative determination is made, the processing section 6 proceeds to S280. If a negative determination is made, the processing section 6 proceeds to S290. The phase condition is that calculated phase differences between a reference reception antenna and other reception antennas are within a predetermined acceptable range, between the candidate peaks. This is based on knowledge that all the peaks based on reflected waves from the identical object should arrive from similar directions, and the fact that all phase differences of peaks arrived from the same direction between the reception channels are similar. Hereinafter, the candidate peak group to which an affirmative determination is made in S270 is referred to as an identical object peak group.

In S280, the processing section 6 registers a set of the target distance r and the target velocity v as object information. In addition, the processing section 6 also adds an azimuth θ calculated as below to the object information. That is, the processing section 6 extracts respective peaks corresponding the M identical object peak groups from respective N velocity spectra calculated for the respective reception antennas. The processing section 6 assumes that the extracted M*N peaks are reception signals from the M*N transmission and reception channels to generate a correlation matrix representing a correlative relationship between the M*N transmission and reception antennas (hereinafter, second correlation matrix) based on complex information on M*N peaks. The peak complex information represents an amplitude and a phase of a reception signal by a complex number.

Then, the processing section 6 performs an azimuth detection process such as MUSIC (Multiple signal classification) or ESPRIT (Estimation of Signal Parameters via Rotational Invariance Techniques) by using the generated second correlation matrix to calculate an azimuth θ of the object.

In S290, the processing section 6 determines whether all the peak detected in the target distance r (i.e., velocities) have been selected as the target velocity v. If an affirmative determination is made, the processing section 6 proceeds to S300. If a negative determination is made, the processing section 6 proceeds to S230.

In S300, the processing section 6 determines whether all the target distances have been selected as the target distance r. If an affirmative determination is made, the processing section 6 ends the information generation process. If a negative determination is made, the processing section 6 proceeds to S220.

After the processing in S110, as shown in FIG. 5, in step S120, the processing section 6 generates correlation matrixes representing a correlative relationship between the reception antennas (hereinafter, first correlation matrixes) for long-distance bins in the distance spectra calculated in S70. The long-distance bin exceeds the short distance determination frequency Fs in the distance spectrum. The correlative relationship is expressed by a coefficient representing similarity between signals acquired by the reception antennas. That is, as the absolute value of the coefficient approaches 0, the correlation is low, and as the absolute value of the coefficient approaches 1, the correlation is high.

Figure 12:
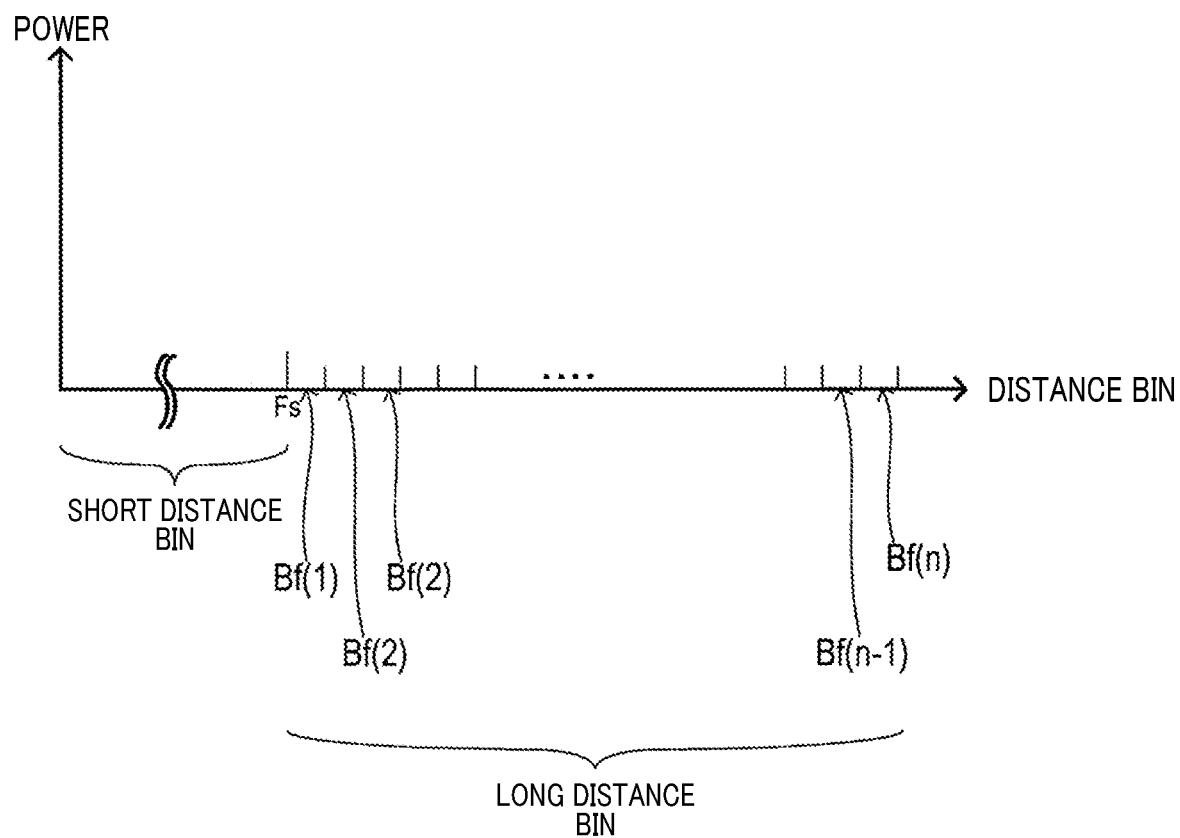
FIG. 12 illustrates long-distance bins.

As shown in FIG. 12, a plurality of long-distance bins in the distance spectrum are indicated by Bf(1), Bf(2), Bf(3), . . . , Bf(n−1), Bf(n) in order of frequencies, where n is an integer equal to or more than 2.

Specifically, the processing section 6 first generates the first correlation matrix based on complex information on the long-distance bins Bf(1) in the N long-distance spectra corresponding to chirp number 1. That is, the processing section 6 generates the first correlation matrix representing a correlative relationship between the N reception antennas that have received reception signals corresponding to chirp number 1 and the long-distance bins Bf(1).

In addition, the processing section 6 generates the first correlation matrix based on complex information of the long-distance bins Bf(2) in the N long-distance spectra corresponding to chirp number 1. In this manner, the processing section 6 repeatedly generates the first correlation matrixes until the long-distance bins Bf(n). Hence, the processing section 6 generates n first correlation matrixes corresponding to chirp number 1 and the long-distance bins Bf(1) to Bf(n).

Next, as in chirp number 1, the processing section 6 also generates n first correlation matrixes corresponding to chirp number 1 to 256 and the long-distance bins Bf(1) to Bf(n), Accordingly, 256 first correlation matrixes are generated for the respective long-distance bins Bf(1) to Bf(n). That is, n*256 first correlation matrixes are generated.

After the processing in S120, as shown in FIG. 5, in S130, the processing section 6 performs the averaging process for the first correlation matrixes. Specifically, the processing section 6 first calculates average values of respective elements in 256 first correlation matrixes corresponding to the long-distance bins Bf(1) by addition averaging to generate one averaged correlation matrix. In addition, as in the long-distance bins Bf(1), the processing section 6 calculates average values of respective elements in 256 first correlation matrixes corresponding to the long-distance bins Bf(2) to Bf(n) to generate one averaged correlation matrix (hereinafter, average correlation matrix). Hence, n average correlation matrixes are generated which correspond to the respective long-distance bins Bf(1) to Bf(n). In the average correlation matrix generated in S110, values of off-diagonal elements representing cross correlation between the reception antennas are suppressed compared with the first correlation matrix generated in S100.

In S130, the processing section 6 performs the averaging process for other than the first correlation matrix corresponding to the chirp set as a failure chirp in S90.

After the processing in S130, in S140, the processing section 6 performs azimuth estimation calculation such as MUSIC or ESPRIT for the respective average correlation matrixes by using the n average correlation matrixes generated in S130 to calculate an azimuth in which the object is present. Hence, azimuths are calculated for the respective long-distance bins Bf(1) to Bf(n).

In S150, the processing section 6 registers a set of the distance corresponding to the long-distance bin and the azimuth calculated in S140 as object information. Then, the processing section 6 halts the object detection process.

The radar device 1 configured as described above includes the transmission section 2, the reception antenna section 4, the reception section 5, and the processing section 6.

Every time the predetermined measurement period Tf elapses, the transmission section 2 repeatedly transmits a chirp, whose frequency changes with respect to time, at the predetermined cycle periods Tp, the number of the transmitted chirps being the predetermined repetition number K.

The reception antenna section 4 has a plurality of reception antennas configured so as to receive chirps reflected from an object.

The reception section 5 generates beat signals for the respective chirps, for the respective plurality of reception signals received by the plurality of reception antennas of the reception antenna section 4.

The processing section 6 performs a frequency analysis for respective beat signals to calculate distance spectra that are frequency spectra, in which a distance to an object that has reflected a chirp is associated with a frequency, for the respective plurality of reception antennas and the respective plurality of beat signals.

The processing section 6 generates the first correlation matrixes for the respective long-distance bins for the repetition number K of chirps, based on complex information on the long-distance bins in the long-distance spectra corresponding to the respective reception antennas that have received the identical chirp.

The processing section 6 performs, for the respective long-distance bins, the averaging process for the repetition number K of first correlation matrixes generated so as to correspond to the long-distance bins, to generate average correlation matrixes for the respective long-distance bins. The processing section 6 performs, for the respective long-distance bins, the azimuth estimation calculation using the average correlation matrixes corresponding to the long-distance bins.

The processing section 6 generates a reception spectrum represented by the distance spectra and a velocity spectrum, which is a result of a frequency analysis over a plurality of chirps performed for the respective short-distance bins of the distance spectra.

The processing section 6 generates one second correlation matrix based on complex information on peaks in the reception spectrum. The processing section 6 performs the azimuth estimation calculation using the second correlation matrix.

As described above, the radar device 1 calculates the velocity spectrum for the short-distance bins in the distance spectra to generate one second correlation matrix and performs the azimuth estimation calculation. The radar device 1 performs, for the long-distance bins in the distance spectra, an averaging process for the repetition number K of first correlation matrixes for the respective long-distance bins to perform azimuth estimation calculation with correlation suppression being subjected.

That is, the radar device 1 can obtain the repetition number K of snapshots concerning azimuth estimation for long distances corresponding to frequencies exceeding the short distance determination frequency Fs to perform correlation suppression of the correlation matrix. Hence, the radar device 1 can improve ability to separate a plurality of objects present at long distances from the radar device 1 by azimuths, thereby improving accuracy in the azimuth estimation.

Figure 13:
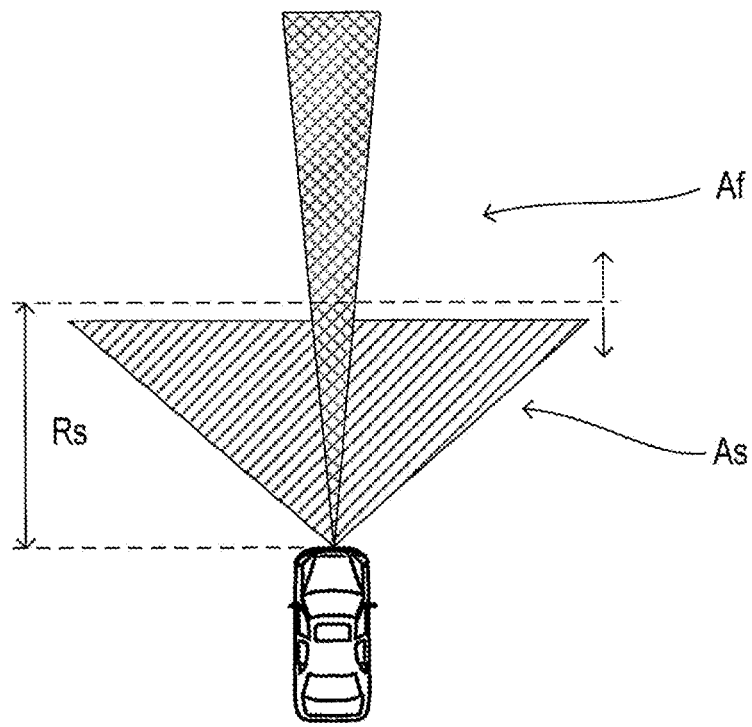
FIG. 13 illustrates a short-distance area and a long-distance area.

As shown in FIG. 13, the radar device 1 requires velocity separation performance rather than azimuth angle separation performance in a short-distance area As in which the distance to an object is equal to or less than a distance Rs corresponding to the short distance determination frequency Fs. The radar device 1 requires azimuth angle separation performance rather than rather than velocity separation performance in a long-distance area Af in which the distance to an object is more than the distance Rs.

Figure 14:
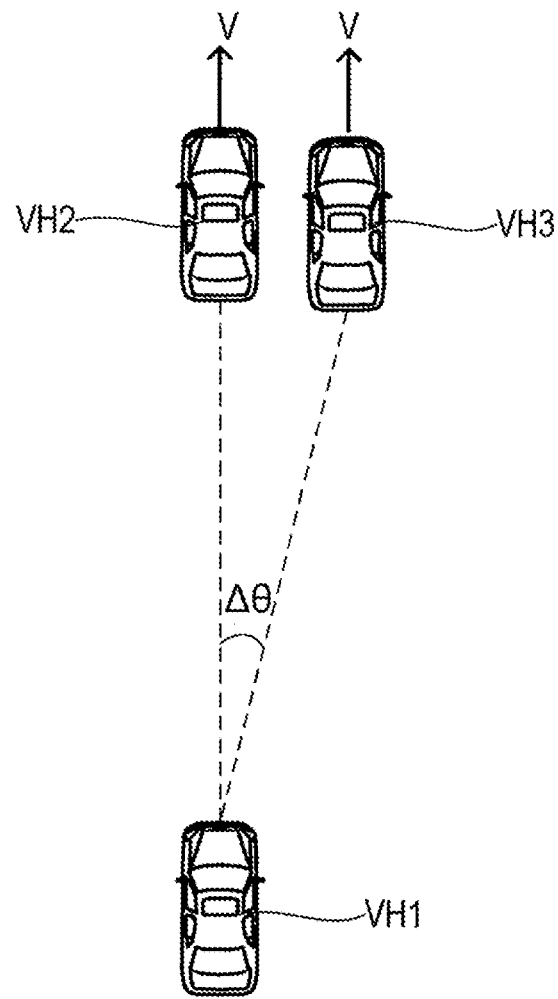
FIG. 14 illustrates a state in which two vehicles are traveling side by side at a long distance.

For example, as shown in FIG. 14, in front of a vehicle VH1 in which the radar device 1 is installed, two vehicles VH2 and VH3 traveling side by side at the same speed V are present. The vehicles VH2 and VH3 are present within the long-distance area Af of the radar device 1.

Figure 15:
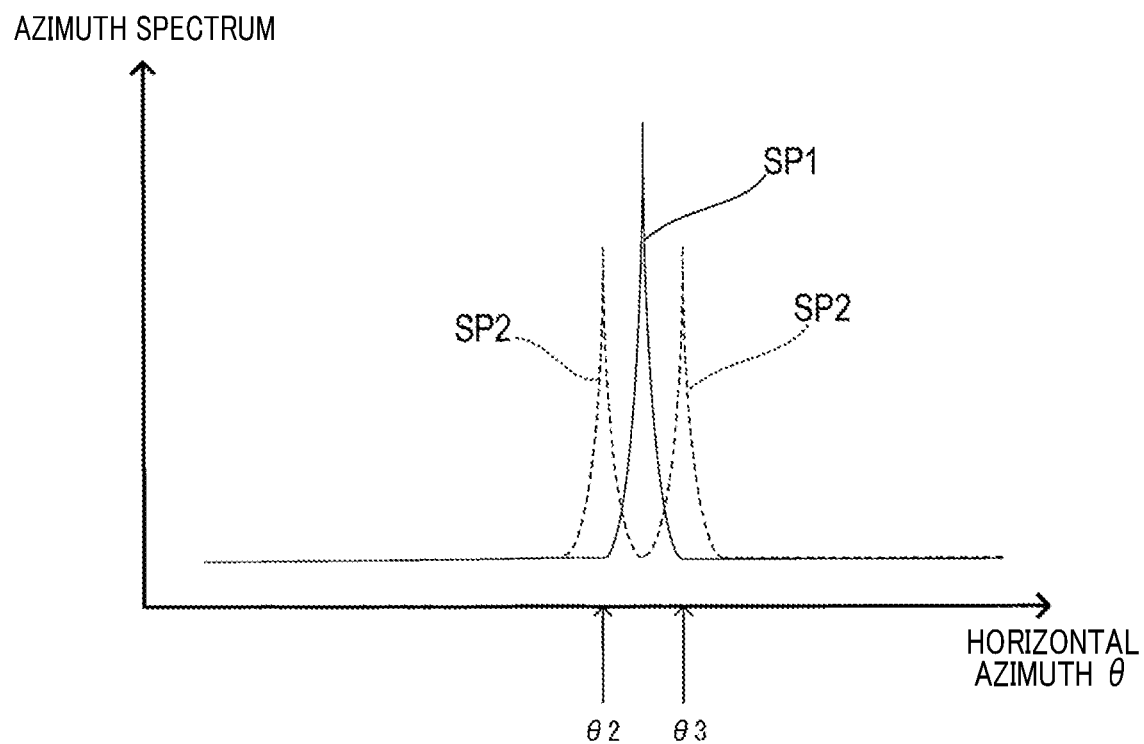
FIG. 15 illustrates an azimuth spectrum.

The relative distances from the vehicle VH1 to the vehicles VH2 and VH3 are equal. The relative velocities of the vehicles VH2 and VH3 with respect to the vehicle VH1 are equal. According to conventional processing methods, the vehicles VH2 and VH3 cannot be separated based on distances and velocities. In addition, since the vehicles VH2 and VH3 are very close to each other at the long distance, a difference AO between azimuth angles of the vehicle VH2 and the vehicle VH3 is very small. Hence, according to the conventional processing methods, as indicated by a solid line SP1 in the azimuth spectrum in FIG. 15, it is difficult to separate the vehicles VH2 and VH3 based on azimuths. In contrast, according to the processing method of the present embodiment, as indicated by a solid line SP2 in the azimuth spectrum in FIG. 15, an azimuth angle $\theta 2$ of the vehicle VH2 and an azimuth angle $\theta 3$ of the vehicle VH3 can be separated.

In the radar device 1, the short distance determination frequency Fs is variable. Hence, the radar device 1 can set an area in which accuracy in azimuth estimation improves, depending on circumstances around the vehicle in which the radar device 1 is installed.

In a road on which the vehicle in which the radar device 1 is installed is traveling, if a predetermined determination frequency setting condition is met which indicates that stationary objects are continuously present along at least one side of the two sides of the road, the radar device 1 lowers the short distance determination frequency Fs compared with a case in which the determination frequency setting condition is not met. In the present embodiment, the determination frequency setting condition is that the vehicle is traveling through a tunnel. Hence, in a situation in which a mirror ghost signal is easily generated, the radar device 1 can set the short distance determination frequency Fs so as to extend an area in which a target signal and the mirror ghost signal can be separated, whereby accuracy in azimuth estimation can be further improved. The above target signal can be obtained by directly receiving chirps reflected from an object. The above mirror ghost signal can be obtained by receiving chirps reflected from an object and further reflected from the stationary object (in the present embodiment, a wall of the tunnel).

The radar device 1 determines whether the chirps received by the reception antenna section 4 are failures. Then, the radar device 1 performs the averaging process for other than the first correlation matrixes corresponding to the chirps determined as failures. Hence, for example, the radar device 1 can perform azimuth estimation calculation for other than the first correlation matrixes corresponding to the chirps on which noise is superimposed.

In the embodiment described above, S70 corresponds to processing as a frequency analysis section. S120 corresponds to processing as a first correlation matrix generation section. S130 corresponds to processing as an averaging process section. S140 corresponds to processing as a first azimuth estimation section.

S100 corresponds to processing as a two-dimensional spectrum generation section. S280 corresponds to processing as a second correlation matrix generation section and a second azimuth estimation section. The reception spectrum corresponds to a two-dimensional spectrum.

S80 corresponds to processing as a frequency setting section. S90 corresponds to processing as a failure determination section.

The present disclosure is not limited to the above embodiment but may be implemented as various modifications.

[Modification 1]

For example, in the above embodiment, the FCM method is used as a modulation method. However, the modulation method is not limited to the FCM method. For example, a modulation method that can obtain a two-dimensional spectrum corresponding to a distance and a velocity by a frequency analysis, such as the pulse Doppler modulation method, may be used.

[Modification 2]

In the above embodiment, the determination frequency setting condition is that the vehicle is traveling through a tunnel. However, for example, the determination frequency setting condition may be that guardrails continue along at least one of the two side of a road.

Functions of one element in the above embodiment may be divided into a plurality of elements. Functions of a plurality of elements may be performed by one element. Part of the configuration of the above embodiment may be omitted. At least part of the configuration of the above embodiment may be added to the configuration of another embodiment or may be replaced by part of the configuration of another embodiment.

The present disclosure may be implemented by, in addition to the radar device 1 described above, various forms such as a system including the radar device 1 as an element, a program causing a computer to function as the radar device 1, a medium storing the program, and an azimuth estimation method.

An aspect of the present disclosure is a radar device (1) including a transmission section (2), a reception antenna section (4), a reception section (5), a frequency analysis section (S70), a first correlation matrix generation section (S120), an averaging process section (S130), a first azimuth estimation section (S140), a two-dimensional spectrum generation section (S100), a second correlation matrix generation section (S280), and a second azimuth estimation section (S280).

The transmission section is configured to, every time a predetermined measurement period elapses, repeatedly transmit a chirp, whose frequency changes with respect to time, at predetermined cycle periods, the number of the transmitted chirps being a predetermined repetition number.

The reception antenna section has a plurality of reception antennas configured so as to receive the chirps reflected from an object.

The reception section is configured to generate beat signals for the respective chirps, for a respective plurality of reception signals received by the plurality of reception antennas of the reception antenna section.

The frequency analysis section is configured to perform a frequency analysis for the respective beat signals to calculate distance spectra that are frequency spectra, in which a distance to the object that has reflected the chirp is associated with a frequency, for the respective plurality of reception antennas and the respective plurality of beat signals The first correlation matrix generation section is configured to define a plurality of frequency bins indicating different frequency ranges in the distance spectra as distance bins, define any of the distance bins, whose frequency corresponding to the distance bin is equal to or less than a predetermined short distance determination frequency, as short-distance bins, define any of the distance bins, whose frequency corresponding to the distance bin is more than the short distance determination frequency, as long-distance bins, and generate, for the repetition number of chirps, first correlation matrixes for the respective distance bins based on complex information on the long-distance bins in the distance spectra corresponding to the respective reception antennas that have received the identical chirp.

The averaging process section is configured to perform, for the respective long-distance bins, an averaging process for the repetition number of first correlation matrixes generated so as to correspond to the long-distance bins, to generate average correlation matrixes for the respective long-distance bins.

The first azimuth estimation section is configured to perform, for the respective long-distance bins, azimuth estimation calculation using the average correlation matrixes corresponding to the long-distance bins.

The two-dimensional spectrum generation section is configured to generate a two-dimensional spectrum represented by the distance spectra and a velocity spectrum, which is a result of a frequency analysis over the plurality of chirps performed for the respective short-distance bins of the distance spectra.

The second correlation matrix generation section is configured to generate one second correlation matrix based on complex information on peaks in the two-dimensional spectrum.

The second azimuth estimation section is configured to perform azimuth estimation calculation using the second correlation matrix.

The radar device configured as described above first calculates the velocity spectrum for the short-distance bins in the distance spectra to generate one second correlation matrix and performs the azimuth estimation calculation. The radar device performs, for the long-distance bins in the distance spectra, an averaging process for the repetition number of first correlation matrixes for the respective long-distance bins to perform azimuth estimation calculation with correlation suppression being subjected That is, the radar device can obtain the repetition number of snapshots concerning azimuth estimation for long distances corresponding to frequencies exceeding the short distance determination frequency to perform correlation suppression of the correlation matrix. Hence, the radar device can improve ability to separate a plurality of objects present at long distances from the radar device by azimuths, thereby improving accuracy in the azimuth estimation.

What is claimed is:

1. A radar device, comprising:
    a transmission section configured to, every time a predetermined measurement period elapses, repeatedly transmit a chirp, whose frequency changes with respect to time, at predetermined cycle periods, the number of the transmitted chirps being a predetermined repetition number;
    a reception antenna section that has a plurality of reception antennas configured so as to receive the chirps reflected from an object;
    a reception section configured to generate beat signals for the respective chirps, for a respective plurality of reception signals received by the plurality of reception antennas of the reception antenna section;
    a frequency analysis section configured to perform a frequency analysis for the respective beat signals to calculate distance spectra that are frequency spectra, in which a distance to the object that has reflected the chirp is associated with a frequency, for the respective plurality of reception antennas and the respective plurality of beat signals;
    a first correlation matrix generation section configured to define a plurality of frequency bins indicating different frequency ranges in the distance spectra as distance bins, define any of the distance bins, whose frequency corresponding to the distance bin is equal to or less than a predetermined short distance determination frequency, as short-distance bins, define any of the distance bins, whose frequency corresponding to the distance bin is more than the short distance determination frequency, as long-distance bins, and generate, for the repetition number of chirps, first correlation matrixes for the respective distance bins based on complex information on the long-distance bins in the distance spectra corresponding to the respective reception antennas that have received the identical chirp;
    an averaging process section configured to perform, for the respective long-distance bins, an averaging process for the repetition number of first correlation matrixes generated so as to correspond to the long-distance bins, to generate average correlation matrixes for the respective long-distance bins;
    a first azimuth estimation section configured to perform, for the respective long-distance bins, azimuth estimation calculation using the average correlation matrixes corresponding to the long-distance bins;
    a two-dimensional spectrum generation section configured to generate a two-dimensional spectrum represented by the distance spectra and a velocity spectrum, which is a result of a frequency analysis over the plurality of chirps performed for the respective short-distance bins of the distance spectra;
    a second correlation matrix generation section configured to generate one second correlation matrix based on complex information on peaks in the two-dimensional spectrum; and a second azimuth estimation section configured to perform azimuth estimation calculation using the second correlation matrix.

2. The radar device according to claim 1, wherein the short distance determination frequency is variable.

3. The radar device according to claim 2, further comprising a frequency setting section configured to, in a road on which a vehicle in which the radar device is installed is traveling, if a predetermined determination frequency setting condition is met which indicates that stationary objects are continuously present along at least one of the two sides of the road, lower the short distance determination frequency compared with a case in which the determination frequency setting condition is not met.

4. The radar device according to claim 1, further comprising a failure determination section configured to determine whether the chirps received by the reception antenna section are failures, wherein the averaging process section performs the averaging process for other than the first correlation matrixes corresponding to the chirps determined as failures.

* * * * *